(12) United States Patent
Baar

(10) Patent No.: US 7,761,713 B2
(45) Date of Patent: Jul. 20, 2010

(54) METHOD AND SYSTEM FOR CONTROLLING ACCESS IN DETAIL-IN-CONTEXT PRESENTATIONS

(76) Inventor: David J. P. Baar, 3536 West 3rd Avenue, Vancouver, B.C. (CA) V6R 1L7

( * ) Notice: Subject to any disclaimer, the term of this patent is extended or adjusted under 35 U.S.C. 154(b) by 1602 days.

(21) Appl. No.: 10/705,199

(22) Filed: Nov. 12, 2003

(65) Prior Publication Data

US 2004/0139330 A1    Jul. 15, 2004

(30) Foreign Application Priority Data

Nov. 15, 2002    (CA)    ................................ 2411898

(51) Int. Cl.
G06F 21/00    (2006.01)
(52) U.S. Cl. ........................ 713/182; 382/299
(58) Field of Classification Search ......... 713/182–186; 382/107, 276, 299; 345/660
See application file for complete search history.

(56) References Cited

U.S. PATENT DOCUMENTS

| | | | |
|---|---|---|---|
| 3,201,546 A | 8/1965 | Richardson | |
| 4,581,647 A | 4/1986 | Vye | |
| 4,630,110 A | 12/1986 | Cotton et al. | |
| 4,688,181 A | 8/1987 | Cottrell et al. | |
| 4,790,028 A * | 12/1988 | Ramage | ........................ 382/298 |
| 4,800,379 A | 1/1989 | Yeomans | |
| 4,885,702 A | 12/1989 | Ohba | |
| 4,888,713 A | 12/1989 | Falk | |
| 4,985,849 A | 1/1991 | Hideaki | |
| 4,992,866 A | 2/1991 | Morgan | |
| 5,048,077 A | 9/1991 | Wells et al. | |
| 5,175,808 A | 12/1992 | Sayre | |
| 5,185,599 A | 2/1993 | Dorrnink et al. | |
| 5,185,667 A | 2/1993 | Zimmermann | |
| 5,200,818 A | 4/1993 | Neta et al. | |
| 5,206,721 A | 4/1993 | Ashida et al. | |
| 5,227,771 A * | 7/1993 | Kerr et al. | .................... 715/800 |
| 5,250,934 A | 10/1993 | Denber et al. | |
| 5,258,837 A | 11/1993 | Gormley | |
| 5,321,807 A * | 6/1994 | Mumford | .................... 345/543 |
| 5,329,310 A | 7/1994 | Liljegren et al. | |
| 5,341,466 A | 8/1994 | Perlin et al. | |
| 5,416,900 A | 5/1995 | Blanchard et al. | |

(Continued)

FOREIGN PATENT DOCUMENTS

CA    2350342    11/2002

(Continued)

OTHER PUBLICATIONS

M.S.T. Carpendale and Catherine Montagnese, A Framework for Unifying Presentation Space, University of Calgary, Nov. 11, 2001.*

(Continued)

*Primary Examiner*—Kimyen Vu
*Assistant Examiner*—Suman Debnath

(57) ABSTRACT

A method for controlling access to secured information for a predetermined region of a computer generated original image presented on a display, comprising: determining whether a user is authorized to access the secured information; and, in response to the determining, distorting the original image to produce a distorted region for the predetermined region to provide the user with the secured information on the display.

32 Claims, 9 Drawing Sheets

U.S. PATENT DOCUMENTS

| | | | |
|---|---|---|---|
| 5,432,895 A | 7/1995 | Myers | |
| 5,451,998 A | 9/1995 | Hamrick | |
| 5,459,488 A | 10/1995 | Geiser | |
| 5,473,740 A | 12/1995 | Kasson | |
| 5,521,634 A | 5/1996 | McGary | |
| 5,523,783 A | 6/1996 | Cho | |
| 5,528,289 A | 6/1996 | Cortjens et al. | |
| 5,539,534 A | 7/1996 | Hino et al. | |
| 5,581,670 A | 12/1996 | Bier et al. | |
| 5,583,977 A | 12/1996 | Seidl | |
| 5,588,098 A | 12/1996 | Chen et al. | |
| 5,594,859 A | 1/1997 | Palmer et al. | |
| 5,596,690 A | 1/1997 | Stone et al. | |
| 5,598,297 A | 1/1997 | Yamanaka et al. | |
| 5,610,653 A | 3/1997 | Abecassis | |
| 5,613,032 A | 3/1997 | Cruz et al. | |
| 5,638,523 A * | 6/1997 | Mullet et al. | 715/855 |
| 5,644,758 A | 7/1997 | Patrick | |
| 5,651,107 A | 7/1997 | Frank et al. | |
| 5,652,851 A | 7/1997 | Stone et al. | |
| 5,657,246 A | 8/1997 | Hogan et al. | |
| 5,670,984 A * | 9/1997 | Robertson et al. | 345/585 |
| 5,680,524 A | 10/1997 | Maples et al. | |
| 5,682,489 A | 10/1997 | Harrow et al. | |
| 5,689,287 A | 11/1997 | Mackinlay et al. | |
| 5,689,628 A | 11/1997 | Robertson | |
| 5,721,853 A | 2/1998 | Smith | |
| 5,729,673 A | 3/1998 | Cooper et al. | |
| 5,731,805 A | 3/1998 | Tognazzini et al. | |
| 5,742,272 A | 4/1998 | Kitamura et al. | |
| 5,745,166 A | 4/1998 | Rhodes et al. | |
| 5,751,289 A | 5/1998 | Myers | |
| 5,754,348 A | 5/1998 | Soohoo | |
| 5,764,139 A | 6/1998 | Nojima et al. | |
| 5,786,814 A | 7/1998 | Moran et al. | |
| 5,798,752 A * | 8/1998 | Buxton et al. | 715/863 |
| 5,808,670 A | 9/1998 | Oyashiki et al. | |
| 5,812,111 A | 9/1998 | Fuji et al. | |
| 5,818,455 A * | 10/1998 | Stone et al. | 345/619 |
| 5,848,231 A | 12/1998 | Teitelbaum et al. | |
| 5,852,440 A | 12/1998 | Grossman et al. | |
| 5,872,922 A | 2/1999 | Hogan et al. | |
| 5,909,219 A | 6/1999 | Dye | |
| 5,923,364 A | 7/1999 | Rhodes et al. | |
| 5,926,209 A | 7/1999 | Glatt | |
| 5,949,430 A | 9/1999 | Robertson et al. | |
| 5,950,216 A * | 9/1999 | Amro et al. | 715/515 |
| 5,969,706 A | 10/1999 | Tanimoto et al. | |
| 5,973,694 A | 10/1999 | Steele et al. | |
| 5,991,877 A | 11/1999 | Luckenbaugh | |
| 5,999,879 A | 12/1999 | Yano | |
| 6,005,611 A | 12/1999 | Gullichsen et al. | |
| 6,037,939 A | 3/2000 | Kashiwagi et al. | |
| 6,052,110 A | 4/2000 | Sciammarella et al. | |
| 6,057,844 A | 5/2000 | Strauss | |
| 6,064,401 A | 5/2000 | Holzman et al. | |
| 6,067,372 A | 5/2000 | Gur et al. | |
| 6,073,036 A | 6/2000 | Heikkinen et al. | |
| 6,075,531 A | 6/2000 | DeStefano | |
| 6,081,277 A | 6/2000 | Kojima | |
| 6,084,598 A | 7/2000 | Chekerylla | |
| 6,091,771 A | 7/2000 | Seeley et al. | |
| 6,108,005 A | 8/2000 | Starks et al. | |
| 6,128,024 A | 10/2000 | Carver et al. | |
| 6,133,914 A | 10/2000 | Rogers et al. | |
| 6,154,840 A * | 11/2000 | Pebley et al. | 713/160 |
| 6,160,553 A | 12/2000 | Robertson et al. | |
| 6,184,859 B1 | 2/2001 | Kojima | |
| 6,198,484 B1 | 3/2001 | Kameyama | |
| 6,201,546 B1 | 3/2001 | Bodor et al. | |
| 6,201,548 B1 | 3/2001 | Cariffe et al. | |
| 6,204,845 B1 | 3/2001 | Bates et al. | |
| 6,204,850 B1 | 3/2001 | Green | |
| 6,215,491 B1 | 4/2001 | Gould | |
| 6,219,052 B1 | 4/2001 | Gould | |
| 6,241,609 B1 | 6/2001 | Rutgers | |
| 6,246,411 B1 | 6/2001 | Strauss | |
| 6,249,281 B1 | 6/2001 | Chen et al. | |
| 6,256,043 B1 | 7/2001 | Aho et al. | |
| 6,256,115 B1 | 7/2001 | Adler et al. | |
| 6,256,737 B1 * | 7/2001 | Bianco et al. | 713/186 |
| 6,266,082 B1 | 7/2001 | Yonezawa et al. | |
| 6,271,854 B1 | 8/2001 | Light | |
| 6,278,443 B1 | 8/2001 | Amro et al. | |
| 6,278,450 B1 | 8/2001 | Arcuri et al. | |
| 6,288,702 B1 | 9/2001 | Tachibana et al. | |
| 6,304,271 B1 | 10/2001 | Nehme | |
| 6,307,612 B1 | 10/2001 | Smith et al. | |
| 6,320,599 B1 * | 11/2001 | Sciammarella et al. | 345/667 |
| 6,337,709 B1 | 1/2002 | Yamaashi et al. | |
| 6,346,938 B1 | 2/2002 | Chan et al. | |
| 6,346,962 B1 | 2/2002 | Goodridge | |
| 6,359,615 B1 | 3/2002 | Singh | |
| 6,381,583 B1 | 4/2002 | Kenney | |
| 6,384,849 B1 | 5/2002 | Morcos et al. | |
| 6,396,648 B1 | 5/2002 | Yamamoto et al. | |
| 6,396,962 B1 | 5/2002 | Haffey et al. | |
| 6,400,848 B1 | 6/2002 | Gallagher | |
| 6,407,747 B1 | 6/2002 | Chui et al. | |
| 6,411,274 B2 | 6/2002 | Watanabe et al. | |
| 6,416,186 B1 | 7/2002 | Nakamura | |
| 6,417,867 B1 | 7/2002 | Hallberg | |
| 6,438,576 B1 | 8/2002 | Huang et al. | |
| 6,487,497 B2 | 11/2002 | Khavakh et al. | |
| 6,491,585 B1 | 12/2002 | Miyamoto et al. | |
| 6,504,535 B1 | 1/2003 | Edmark | |
| 6,515,678 B1 | 2/2003 | Boger | |
| 6,522,341 B1 | 2/2003 | Nagata | |
| 6,542,191 B1 | 4/2003 | Yonezawa | |
| 6,552,737 B1 | 4/2003 | Tanaka et al. | |
| 6,559,813 B1 | 5/2003 | DeLuca et al. | |
| 6,577,311 B1 | 6/2003 | Crosby et al. | |
| 6,577,319 B1 | 6/2003 | Kashiwagi et al. | |
| 6,584,237 B1 * | 6/2003 | Abe | 382/299 |
| 6,590,568 B1 | 7/2003 | Astala et al. | |
| 6,590,583 B2 * | 7/2003 | Soohoo | 345/660 |
| 6,608,631 B1 | 8/2003 | Milliron | |
| 6,612,930 B2 | 9/2003 | Kawagoe et al. | |
| 6,631,205 B1 | 10/2003 | Melen et al. | |
| 6,633,305 B1 * | 10/2003 | Sarfeld | 345/671 |
| 6,690,387 B2 | 2/2004 | Zimmerman et al. | |
| 6,720,971 B1 | 4/2004 | Yamamoto et al. | |
| 6,727,910 B2 | 4/2004 | Tigges | |
| 6,731,315 B1 | 5/2004 | Ma et al. | |
| 6,744,430 B1 | 6/2004 | Shimizu | |
| 6,747,610 B1 | 6/2004 | Taima et al. | |
| 6,747,611 B1 | 6/2004 | Budd et al. | |
| 6,760,020 B1 | 7/2004 | Uchiyama et al. | |
| 6,768,497 B2 | 7/2004 | Baar et al. | |
| 6,798,412 B2 | 9/2004 | Cowperthwaite | |
| 6,833,843 B2 | 12/2004 | Mojaver et al. | |
| 6,842,175 B1 | 1/2005 | Schmalstieg et al. | |
| 6,882,755 B2 | 4/2005 | Silverstein et al. | |
| 6,906,643 B2 | 6/2005 | Samadani et al. | |
| 6,911,975 B2 | 6/2005 | Iizuka et al. | |
| 6,919,921 B1 | 7/2005 | Morota et al. | |
| 6,924,822 B2 | 8/2005 | Card et al. | |
| 6,938,218 B1 | 8/2005 | Rosen | |
| 6,956,590 B1 * | 10/2005 | Barton et al. | 345/684 |
| 6,961,071 B2 | 11/2005 | Montagnese et al. | |
| 6,975,335 B2 | 12/2005 | Watanabe | |
| 6,985,865 B1 | 1/2006 | Packingham et al. | |
| 7,038,680 B2 | 5/2006 | Pitkow | |
| 7,071,971 B2 | 7/2006 | Elberbaum | |

| | | |
|---|---|---|
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,472,354 B2 | 12/2008 | Jetha et al. |
| 7,486,302 B2 | 2/2009 | Shoemaker |
| 7,489,321 B2 | 2/2009 | Jetha et al. |
| 7,495,678 B2 | 2/2009 | Doyle et al. |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han, II |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1* | 7/2002 | Foley et al. ........... 713/202 |
| 2002/0089520 A1 | 7/2002 | Baar |
| 2002/0093567 A1* | 7/2002 | Cromer et al. ......... 348/207 |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1* | 3/2003 | Harju et al. ........... 356/417 |
| 2003/0052896 A1 | 3/2003 | Higgins et al. |
| 2003/0061211 A1 | 3/2003 | Shultz et al. |
| 2003/0100326 A1 | 5/2003 | Grube et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1* | 9/2003 | Nelson et al. ......... 345/765 |
| 2003/0196114 A1* | 10/2003 | Brew et al. ........... 713/201 |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0278378 A1 | 12/2005 | Frank |
| 2005/0285861 A1 | 12/2005 | Fraser |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle |

FOREIGN PATENT DOCUMENTS

| | | |
|---|---|---|
| CA | 2386560 | 11/2003 |
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |

OTHER PUBLICATIONS

Carpendale, Marianne S. T., A Framework For Elastic Presentation Space (Burnaby, British Columbia: Simon Fraser University, 1999).

Robertson, et al., ""The Document Lens"", *Cited by examiner*, (1993),pp. 101-108.

"Non Final OA", U.S. Appl. No. 11/935,222, (Feb. 20, 2009),12 pages.

Ikedo, T ""A Realtime Video-Image Mapping User Polygon Rendering Techniques"", *IEEE Intl. conf on Ottawa, ONT*, Canada Jun. 3-6, 1997, Los Alamitos, CA, USA; *IEEE Comput. Soc, US, XP010239181, ISBN: 0-8186-7819-4 Sections 2, 4.4; Cited by Examiner*, Multimedia Computing and Systems '97 Proceedings,(Jun. 3, 1997), pp. 127-134.

Bouju, A. et al., ""Client-Server Architecture for Accessing Multimedia and Geographic Databases within Embedded Systems"", *Database and Expert Systems Applications, 1999 Proceedings. Tenth International Workshop* on Florence, Italy Sep. 1-3, 1999, Los Alamitos, CA, USA, *IEEE Comput. Soc, US, Cited by examiner*, XP010352370; ISBN:0-7695-0281-4, abstract, figure 2,(Sep. 1-3, 1999),pp. 760-764.

Robertson, G et al., "The Document Lens", *UIST. Proceedings of the Annual ACM Symposium on User Interface Software and Technology. Cited by Examiner*, abstract figures 3,4,(Nov. 3, 1993),pp. 101-108.

Dursteler, Juan C., "The digital magazine of InfoVis.net", *Retrieved from*: http://www.infovis.net/printMag.php?num=85&lang=2; *cited by examiner*, (Apr. 22, 2002).

"Presentation for CGDI Workshop", *Retrieved from*: http://www.geoconnections.org/developersCorner/devCorner_devNetwork/meetings/2002.05.30/IDELIX_CGDI_20020530_dist.pdf, (May, 2002).

Kuederle, Oliver ""Presentation of Image Sequences: A Detail-In-Context Approach"", *Thesis, Simon Fraser University; Cited by Examiner*, (Aug. 2000),pp. 1-3, 5-10, 29-31.

Microsoft Corp., "Microsoft Paint", Microsoft Corp.,(1981-1998),Paint 1-14.

"Electronic Magnifying Glasses", *IBM Technical Disclosure Bulletin, IBM Corp.*, New York, US, vol. 37, No. 3; XP000441501, ISSN: 0018-8689 *the whole document; Cited by Examiner*, (Mar. 1, 1994),pp. 353-354.

Keahey, T. A., ""The Generalized Detail-In-Context Problem"", *Information Visualization 1998, Proceedings; IEEE Symposium on Research* Triangle, CA, USA; Los Alamitos, CA, USA, *IEEE Comput. Soc, US; Cited by Examiner, XP010313304; ISBN: 0-8186-9093*,(Oct. 19-20, 1998),pp. 44-51, 152.

Carpendale, et al., ""3-Dimensional Pliable Surfaces: For the Effective Presentation of Visual Information"", *Proceedings of the 8th annual ACM symposium on User interface and software technology; cited by examiner*, (Dec. 1995).

Carpendale, M S T et al., ""Extending distortion viewing from 2D to 3D"", *IEEE Computer Graphics and Applications, IEEE Inc.* New York, US, vol. 17, No.4; XP000927815, ISSN: 0272-1716. *Cited by Examiner*, (Jul. 1997),pp. 42-51.

Viega, J et al., ""3D magic lenses"", *Proceedings of the 9th annual ACM symposium on User interface software and technology; Pub 1996 ACM Press* New York, NY, USA; *cited by examiner*, (1996),51-58.

Cowperthwaite, David J., ""Occlusion Resolution Operators for Three-Dimensional Detail-In-Context"", *Burnaby*, British Columbia: Simon Fraser University; *cited by examiner*, (2000).

Carpendale, M.S.T. ""A Framework For Elastic Presentation Space"", Thesis Simon Fraser University, XP001051168; *cited in the application, Chapter 3-5; appendix A,B; Cited by Examiner*, (Mar. 1999),pp. 1-271.

Carpendale, M.S.T. et al., ""Exploring Distinct Aspects of the Distortion Viewing Paradigm"", *Technical Report TR 97-08, School of Computer Science*, Simon Fraser University, Burnaby, British Columbia, Canada; *Cited by examiner*, (Sep. 1997).

Cowperthwaite, David J., et al., ""Visual Access For 3D Data"", in *Proceedings of ACM CHI 96 Conference on Human Factors in Computer Systems, vol. 2 of Short Papers: Alternative Methods of Interaction; cited by examiner*, (1996),pp. 175-176.

Keahey, T. A., ""Visualization of High-Dimensional Clusters Using NonLinear Magnification"", *Technical Report LA-UR-98-2776*, Los Alamos National Laborator; *Cited by Examiner*, (1998).

Tigges, M. et al., ""Generalized Distance Metrics For Implicit Surface Modeling"", *Proceedings of the Tenth Western Computer Graphics Symposium; Cited by Examiner*, (Mar. 1999).

Bossen, F. J., ""Anisotropic Mesh Generation With Particles"", *Technical Report CMU-CS-96-134, CS Dept*, Carnegie Mellon University; *cited by examiner*, (May 1996).

Bossen, F. J., et al., ""A Pliant Method For Anisotropic Mesh Generation"", *5th Intl. Meshing Roundtable; cited by examiner*, (Oct. 1996),pp. 63-74.

Wilson, et al., ""Direct Volume Rendering Via 3D Textures"", *Technical Report UCSC-CRL-94-19*, University of California, Santa Cruz, *Jack Baskin School of Engineering; cited by examiner*, (Jun. 1994).

Carpendale, M.S.T. "A Framework for Elastic Presentation Space", *PhD. thesis*, Simon Fraser University; *Cited by Examiner*, (1999),pp. 69, 72, 78-83,98-100, 240, and 241.

Keahey, T. A., et al., ""Techniques for Non-Linear Magnification Transformations"", *Information Visualization '96, Proceedings IEEE Symposium on*, San Francisco, CA, Los Alamitos, CA, USA, *IEEE Comput. Soc, US: Cited By Examiner*, XP010201943; ISBN: 0-8186-7668-X the whole document,(Oct. 28,1996),pp. 38-45.

Carpendale, M. Sheelagh T., et al., ""3-Dimensional Pliable Surfaces: For the Effective Presentation of Visual Information"", *UIST '95, 8th Annual Symposium On User Interface Software and Technology, Proceedings Of The ACM Symposium On User Interface Software and Technology*, Pittsburgh, PA, *ACM Symposium On User Interface Software and Technology*, New York, Nov. 14, 1995 (1995-, (Nov. 14-17, 1995),pp. 217-226.

Tominski, Christian et al., ""Fisheye Tree Views and Lenses for Graph Visualization"", *Cited by examiner*, pp. 1-8.

Keahey, T. A., ""Getting Along: Composition of Visualization Paradigms"", *Visual Insights, Inc.; cited by examiner*, (2001).

Sakamoto, Chikara et al., ""Design and Implementation of a Parallel Pthread Library (PPL) with Parallelism and Portability"", *Systems and Computers In Japan*, New York, US, vol. 29, No. 2; *Cited by Examiner*, XP000752780, ISSN: 0882-1666 abstract,(Feb. 1, 1998),pp. 28-35.

Deng, K. et al., ""Texture Mapping with a Jacobian-Based Spatially-Variant Filter",", *Proceedings 10th Pacific Conference on Computer Graphics and Applications*, Beijing, China, 2002 Los Alamitos, CA, USA, *IEEE Comput. Soc, USA; Cited by Examiner*, XP00224932, ISBN; 0-7695-1784-6 the whole document,(Oct. 9-11, 2002),pp. 460-461.

Welsh, Michelle "Futurewave Software", *Business Wire; Cited by Examiner*, (Nov. 15, 1993).

Lamar, et al., "A Magnification Lens for Interactive Volume Visualization", *ACM; Cited by Examiner*, pp. 1-10.

Fitzmaurice, G. et al., ""Tracking Menus"", *UIST; Cited by Examiner*, (2003),pp. 71-79.

Stone, et al., "The movable filter as a user interface tool", *Proceedings of CHI ACM; Cited by Examiner*, (1992),pp. 306-312.

Baudisch, P. et al., ""Halo: a Technique for Visualizing Off-Screen Locations"", *CHI; Cited by Examiner*, (Apr. 5-10, 2003).

Baudisch, P. et al., ""Drag-And-Pop: Techniques For Accessing Remote Screen Content On Touch-And-Pen-Operated Systems"", *Interact'03*, (2003).

Carpendale, M.S.T. et al., ""Making Distortions Comprehensible"", *Visual Languages, Proceedings, 1997 IEEE Symposium On Isle of Capri*, Italy, Sep. 23-26, 1997, Los Alamitos, CA, USA, *IEEE Comput. Soc., US*, Sep. 23, 1997; *Cited by Examiner*, XP010250566, ISBN: 0-8186-8144-6,(Sep. 23-26, 1997),pp. 36-45.

Ito, Minoru et al., ""A Three-Level Checkerboard Pattern (TCP) Projection Method for Curved Surface Measurement"", *Pattern Recognition, Pergamon Press Inc.*, Elmsford, N.Y., US vol. 28, No. 1; *Cited by Examiner*, XP004014030, ISSN 0031-3203,(1995),pp. 27-40.

Keahey, T A., et al., ""Nonlinear Magnification Fields"", *Information Visualization, 1997, Proceedings, IEEE Symposium on* Phoenix, AZ, USA, Los Alamitos, CA, USA, *IEEE Comput. Soc., US; Cited by Examiner*, XP010257169; ISBN: 0-8186-8189-6,(Oct. 20-21, 1997),pp. 51-58 and 121.

Rauschenbach, U. ""The Rectangular Fish Eye View as an Efficient Method for the Transmission and Display of Large Images"", *Image Processing, ICIP 99, Proceedings, 1999 International Conference On*, Kobe, Japan, Oct. 24-28, 1999, Piscataway, NJ, USA, *IEEE, US, XP010368852, ISBN 0-7803-5467-2 p. 115, left-hand column—p. 116, paragraph 3, p. 118, paragraph 7.1; Cited By Ex*, (1999),pp. 115-119.

Keahey, T. A., "Nonlinear Magnification", (Indiana University Computer Science), (1997).

Watt, et al., "Advanced Animation and Rendering Techniques", *(Addison-Wesley Publishing)*, (1992),p. 106-108.

Boots, B. N., "Delauney Triangles: An Alternative Approach to Point Pattern Analysis", *Proc. Assoc. Am. Geogr. 6*, (1974),p. 26-29.

Sheelagh, M. et al., ""Distortion Viewing Techniques for 3-Dimensional Data"", *Information Visualization '96, Proceedings IEEE Symposium On* San Francisco, CA, USA, Los Alamitos, CA, USA, *IEEE Comput. Soc, US* Oct. 28, 1996; *Cited by Examiner*, XP010201944; ISBN: 0-8186-7668-X,(Oct. 28-29, 1996),pp. 46-53, 119.

Leung, Y. K., et al., ""A Review and Taxonomy of Distortion-Oriented Presentation Techniques"", *ACM Transactions on Computer-Human Interaction, 'Online!* vol. 1, No. 2, *XP002252314; Cited by Examiner*, Retrieved from the Internet: <URL:http://citeseer.nj.nec.com/ leung94review.html> 'retrieved on Aug. 21, 2003! the whole document,(Jun. 1994),pp. 126-160.

"Non Final Office Action", U.S. Appl. No. 10/358,394, (Mar. 13, 2009).

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, et al., "Graph Folding: Extending Detail and Context Viewing into a Tool for Subgraph Comparisons", *In Proceedings of Graph Drawing 1995*, Passau, Germany, (1995),pp. 127-139.

Carpendale, M.S.T. "A Framework for Elastic Presentation Space", http://pages.cpsc.ucalgary.ca/~sheelagh/personal/thesis/, (Nov. 19, 1999).

"Non Final Office Action", U.S. Appl. No. 11/542,120, (Jan. 22, 2009), 20 pages.

"Non-Final Office Action", U.S. Appl. No. 11/410,024, (Mar. 11, 2009),35 pages.

"Notice of Allowance", U.S. Appl. No. 11/401,349, (Apr. 17, 2009),35 pages.

Schmalstieg, Dieter et al., "Using transparent props for interaction with the virtual table", Proceedings of the 1999 symposium on Interactive 3D graphics.,(Apr. 26, 1999),8 pages.

"Non Final Office Action", U.S. Appl. No. 11/541,778, (Jun. 19, 2009),36 pages.

"Non Final Office Action", U.S. Appl. No. 11/673,038, (Jul. 13, 2009),45 pages.

"Non Final Office Action", U.S. Appl. No. 11/410,024, (Jul. 20, 2009),27 pages.

Smith, et al., "Efficient techniques for wide-angle stereo vision using surface projection models", *Retrieved from* <http://ieee.org/stamp.jsp?arnumber=17045, (1999),6 pages.

"Non Final Office Action", U.S. Appl. No. 11/159,205, (Jul. 27, 2009),28 pages.

\* cited by examiner

METHOD AND SYSTEM FOR CONTROLLING ACCESS IN DETAIL-IN-CONTEXT PRESENTATIONS

This application claims priority from Canadian Patent Application No. 2,411,898, filed Nov. 15, 2002, the disclosure of which is incorporated herein by reference.

FIELD OF THE INVENTION

This invention relates to the field of computer graphics processing, and more specifically, to a method and system for controlling user access to secured (e.g. detailed) information in a detail-in-context presentation using detail-in-context lenses and a detail-in-context graphical user interface ("GUI").

BACKGROUND OF THE INVENTION

Traditionally, information security in data processing systems has been addressed at the operating system, network, and application or file levels. Application level security and security for data which may be controlled under an application (i.e., so-called "fine grain labelling" at the level of a file or specific information such as a sentence, paragraph or particular numerical data within a file) is typically implemented in a manner that is unique to the application.

Several methods have been proposed for securing information at the application or file level. For example, U.S. Pat. No. 5,991,877 to Luckenbaugh discloses an object-oriented trusted application framework that allows for fine grain labelling. As another example, U.S. Pat. No. 5,848,231 to Teitelbaum, et al., discloses a method for configuring and reconfiguring a computer system based on user authorization wherein users may perceive that they have unlimited access to computer system resources. In one embodiment, in a computer system that includes a GUI, available files are displayed and unavailable files are not such that the unauthorized user is limited to the available files. Through this configuration, the unauthorized user is provided with an interface that suggests that the unavailable files do not exist. However, neither the method of Teitelbaum, et al., nor the framework of Luckenbaugh allows users to effectively contextualize information that is available from that which is not.

To elaborate, a disadvantage of existing methods for securing application level information is that they do not provide a user-friendly indication to users of what information is secured within the context of a larger body of unsecured information. For example, in computer graphics applications which process large graphical image files such as digital maps, it is often important for a user to contextualize the image being presented on a system display screen. That is, while a user may use well-known "panning" and "zooming" tools to view a desired area or object in a large image at an unsecured level, in doing so, the relative location of the corresponding area or object at a detailed and secured level may be lost to the user or the user may find it difficult to determine what portion of the image is being observed. An additional disadvantage of existing methods is that they do not allow for the effective control of access by users to secured detailed information within the context of surrounding unsecured information. These disadvantages are examples of what is often referred to as the "screen real estate problem".

A need therefore exists for an improved method and system for controlling user access to secured (e.g. detailed or confidential) information within the context of surrounding information. Consequently, it is an object of the present invention to obviate or mitigate at least some of the above mentioned disadvantages.

SUMMARY OF THE INVENTION

According to one aspect of the invention, there is provided a method for controlling access to secured information for a predetermined region of a computer generated original image presented on a display, comprising: determining whether a user is authorized to access the secured information; and, in response to the determining, distorting the original image to produce a distorted region for the predetermined region to provide the user with the secured information on the display.

Preferably, the method further includes, in response to the step of determining, uncovering the distorted region.

Preferably, the step of determining further includes receiving authentication information from the user and comparing the authentication information to stored authentication information for the user.

Preferably, the authentication information includes a user identification number and a password.

Preferably, the authentication information is received through a dialog box.

Preferably, the dialog box is presented adjacent to the predetermined region.

Preferably, the method further includes the step of receiving a signal from the user to select the predetermined region.

Preferably, the signal is generated by moving a cursor on the display with a pointing device.

Preferably, the pointing device is a mouse.

Preferably, the secured information is detailed information.

Preferably, the detailed information is a magnified image.

Preferably, the secured information is encrypted information.

Preferably, the step of distorting further comprises decrypting the encrypted information.

Preferably, the original image includes a graphic image, a photographic image, and a text image.

Preferably, the step of distorting further includes: creating a lens surface for the distorted region; and, transforming the original image by applying a distortion function defining the lens surface to the original image.

Preferably, the step of creating further includes displaying a GUI over the distorted region for adjusting the lens surface.

Preferably, the lens surface includes a focal region and a base and the GUI includes: a slide bar icon for adjusting a magnification for the lens surface; a slide bar icon for adjusting a degree of scooping for the lens surface; a bounding rectangle icon with at least one handle icon for adjusting a size and a shape for the focal region; a bounding rectangle icon with at least one handle icon for adjusting a size and a shape for the base; a move icon for adjusting a location for the lens surface within the original image; a pickup icon for adjusting a location for the base within the original image; and, a fold icon for adjusting a location for the focal region relative to the base.

Preferably, the authentication information is biometric information including fingerprint, iris pattern, voice pattern, and DNA pattern information.

According to another aspect of the invention, there is provided a method for accessing detailed information for a predetermined region of a computer generated original image presented on a display, comprising: determining whether a user is authorized to access the detailed information; and, in response to the determining, distorting the original image to produce a distorted region for the predetermined region to provide the user with the detailed information on the display.

Advantageously, while the user access control element provided by the present invention prevents unauthorized viewing of secured information in a lens image, it allows a user to view unsecured information in a surrounding base image. Thus, the context of the secured information within the unsecured information is maintained for the user.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE PREFERRED EMBODIMENTS

Figure 1:
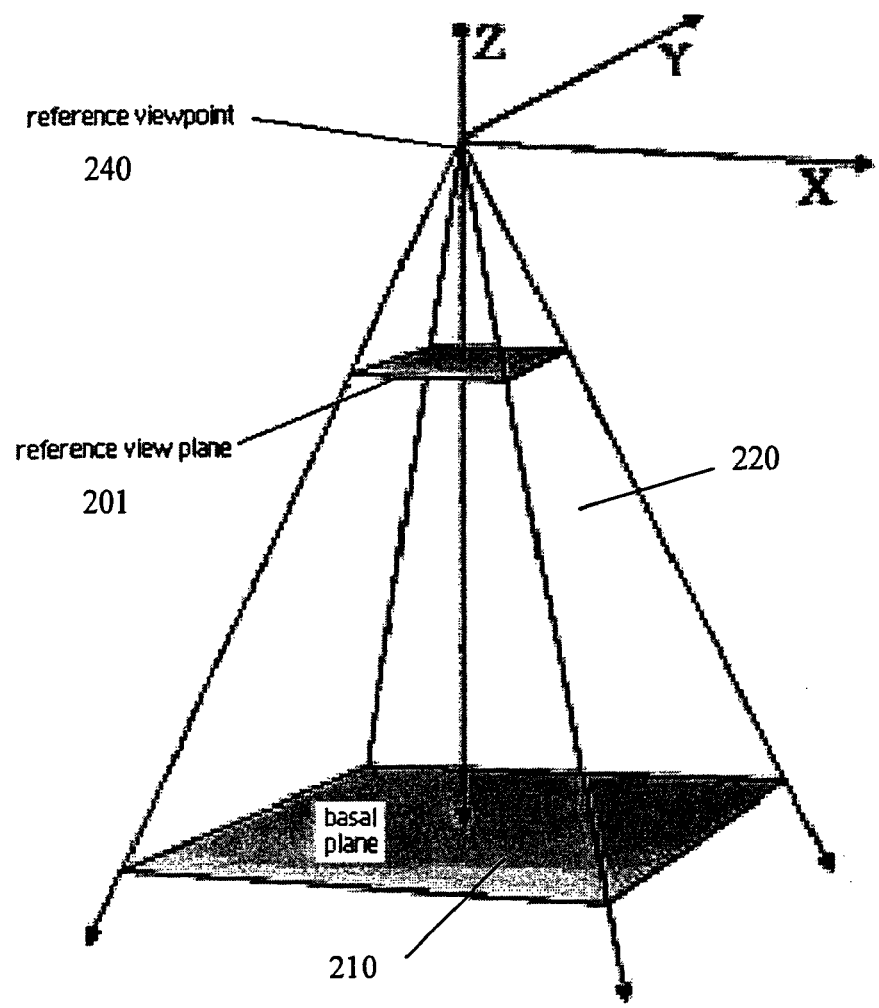
FIG. 1 is a graphical representation of the geometry for constructing a three-dimensional perspective viewing frustum, relative to an x, y, z coordinate system, in accordance with known elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein.

The "screen real estate problem" mentioned above generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation or image where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
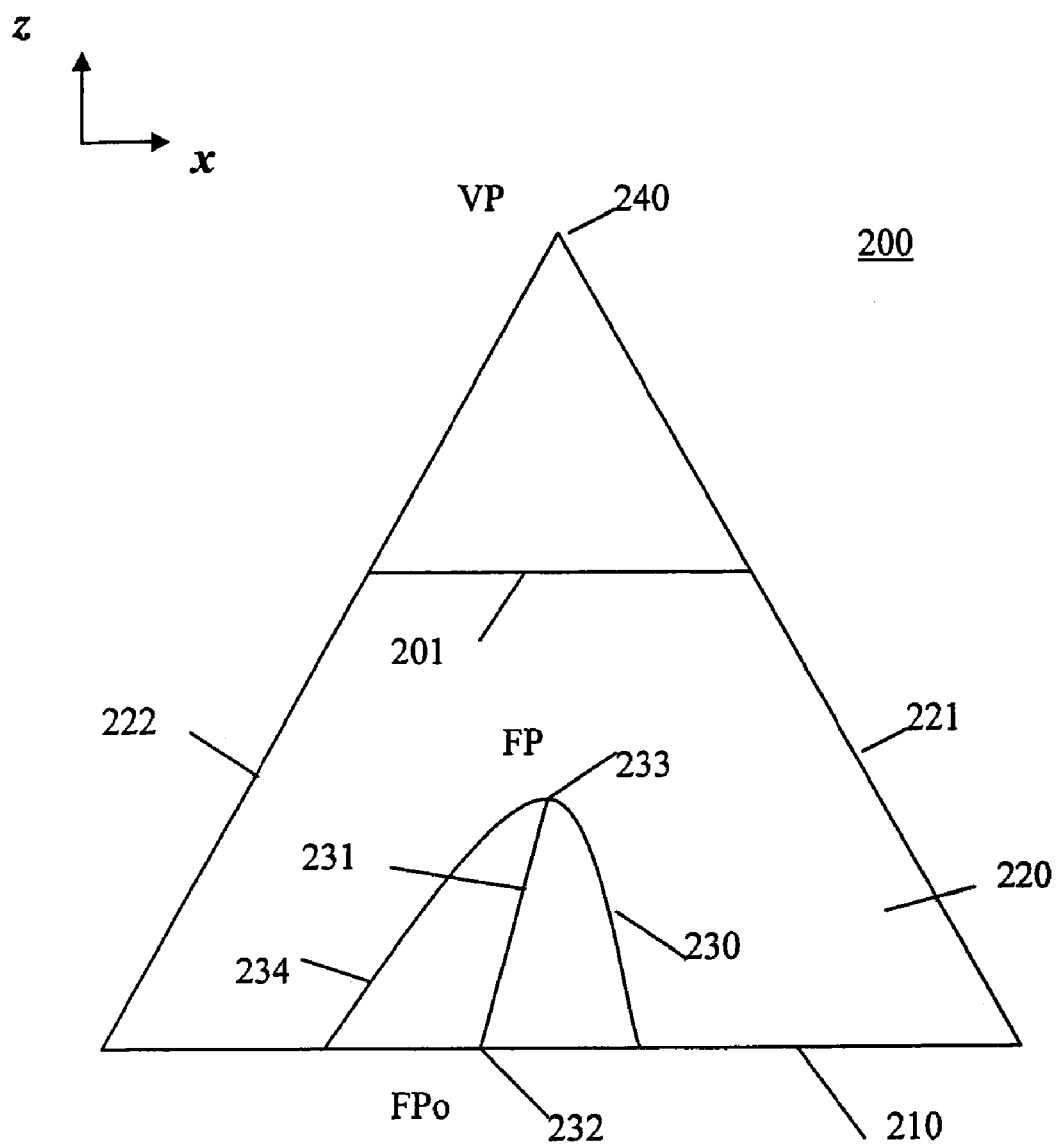
FIG. 2 is a graphical representation of the geometry of a presentation in accordance with known elastic presentation space graphics technology.

FIG. 2 is a graphical representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
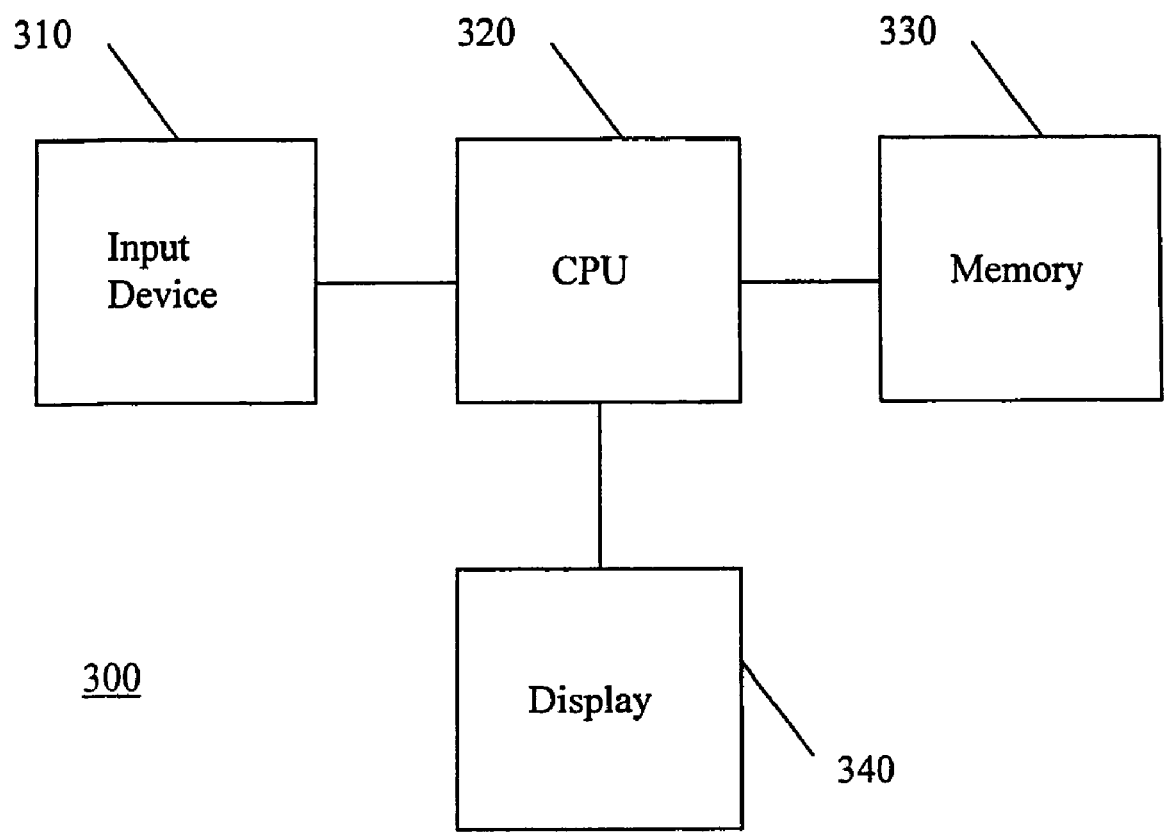
FIG. 3 is a block diagram illustrating a data processing system adapted for implementing an embodiment of the invention.

System. FIG. 3 is a block diagram of a data processing system 300 adapted to implement an embodiment of the invention. The data processing system 300 is suitable for implementing EPS technology, for displaying detail-in-context presentations of representations, and for controlling user access to secured information in conjunction with a detail-in-context graphical user interface (GUI) 400, as described below. The data processing system 300 includes an input device 310, a central processing unit ("CPU") 320, memory 330, and a display 340. The input device 310 may include a keyboard, mouse, trackball, or similar device. The CPU 320 may include dedicated coprocessors and memory devices. The memory 330 may include RAM, ROM, databases, computer-readable media, or disk devices. As described herein, computer-readable media does not include signals per se. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

GUI with Lens Control Elements. As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the editing of multi-layer images and to the control of detail-in-context data presentations. The software can be loaded into and run by the data processing system 300 of FIG. 3.

Figure 4:
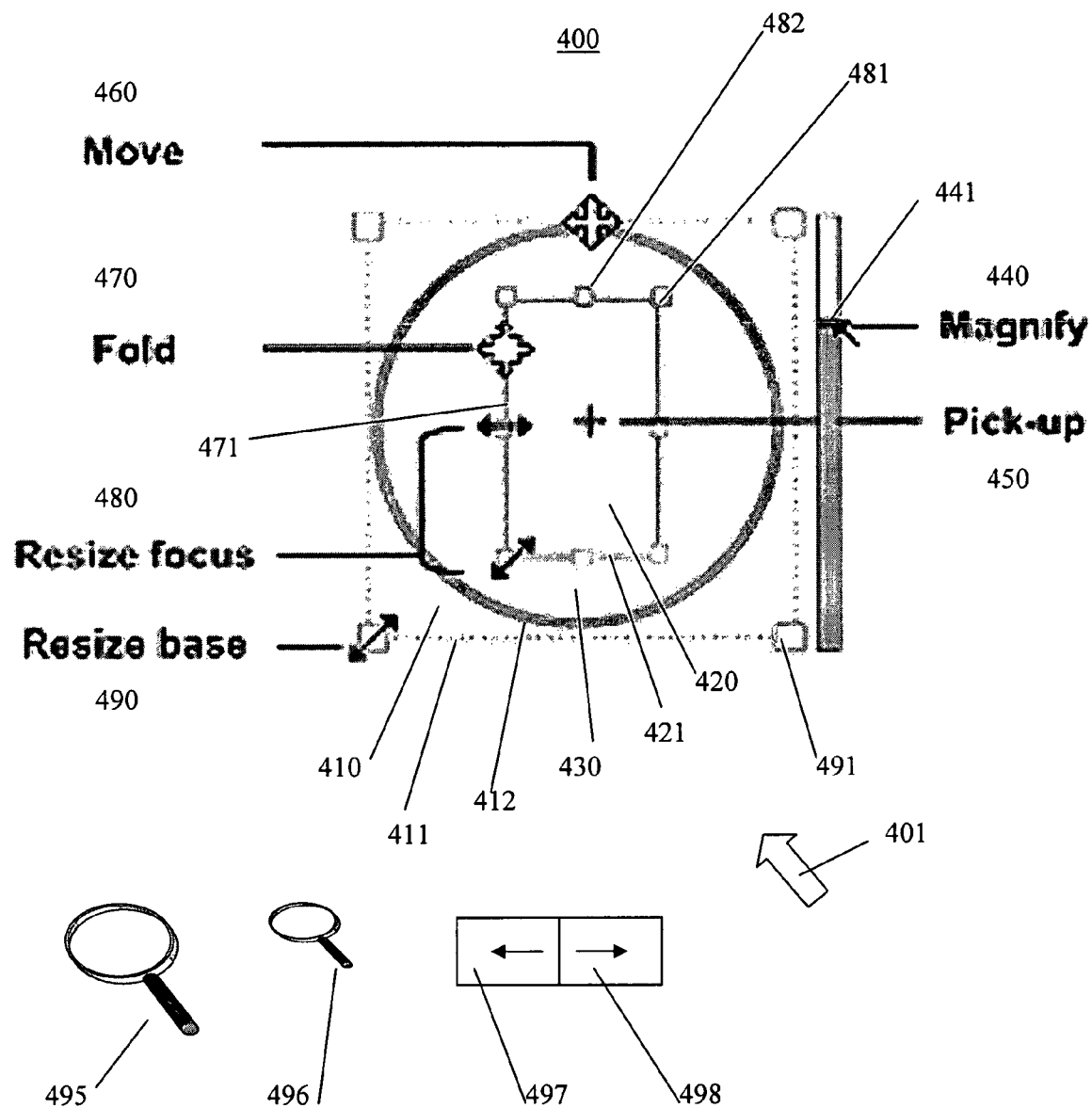
FIG. 4 a partial screen capture illustrating a GUI having lens control elements for user interaction with detail-in-context data presentations in accordance with an embodiment of the invention.

FIG. 4 is a partial screen capture illustrating a GUI 400 having lens control elements For user interaction with detail-in-context data presentations in accordance with an embodiment of the invention. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. For example, in FIG. 6, the lens 410 has a conical frustum shape with a flat top 420 and conical shoulders 430. As mentioned above, the base of the lens 412 may be coextensive with the focal region 420.

In general, the GUI 400 has lens control elements that, in combination, provide for The interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2D or 3D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, zoom, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, magnify slide bar icon 440, zoom icon 495, and scoop slide bar icon 640 (see FIG. 6). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440, 640. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Move. Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 440, 640. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup. Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base. Resizing of the base 412 (or outline) of a lens 410 is provided by the resize base lens control element of the GUI. After the lens 410 is selected, a bounding rectangle icon 411 is displayed surrounding the base 412. For a rectangular shaped base 412, the bounding rectangle icon 411 may be coextensive with the perimeter of the base 412. The bounding rectangle 411 includes handles 491. These handles 491 can be used to stretch the base 412 taller or shorter, wider or narrower, or proportionally larger or smaller. The comer handles 491 will keep the proportions the same while changing the size. The middle handles (not shown) will make the base 412 taller or shorter, wider or narrower. Resizing the base 412 by the comer handles 491 will keep the base 412 in proportion. Resizing the base 412 by the middle handles (not shown) will change the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a comer handle 491 may include arrows indicating proportional resizing. The resize icon (not shown) for a middle handle (not shown) may include arrows indicating width resizing or height resizing. After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resize Focus. Resizing of the focal region 420 of a lens 410 is provided by the resize focus lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The comer handles 481 will keep the proportions the same while changing the size. The middle handles 482 will make the focal region 420 taller or shorter, wider or narrower. Resizing the focal region 420 by the comer handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a comer handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold. Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify. Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom. Zoom functionality is provided by the zoom lens control element of the GUI. Referring to FIG. 2, the zoom lens control element, for example, allows a user to quickly navigate to a region of interest 233 within a continuous view of a larger presentation 210 and then zoom in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom in" to the extent of the focal region such that the extent of the focal region fills the display screen 340 (i.e. "zoom to focal region extent"); (b) "zoom in" to the extent of the lens such that the extent of the lens fills the display screen 340 (i.e. "zoom to lens extent"); or, (c) "zoom in" to the area lying outside of the extent of the focal region such that the area without the focal region is magnified to the same level as the extent of the focal region (i.e. "zoom to scale").

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e. "zoom to focal region extent"), the user would point and click within the extent of the focal region. To zoom in to the extent of the lens such that the extent of the lens fills the display screen 340 (i.e. "zoom to lens extent"), the user would point and click within the extent of the lens. Or, to zoom in to the presentation area without the extent of the focal region, such that the area without the extent of the focal region is magnified to the same level as the extent of the focal region (i.e. "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

Scoop. The concavity or "scoop" of the shoulder region 430 of the lens 410 is provided by the scoop lens control element of the GUI. After the lens 410 is selected, the scoop control is presented to the user as a slide bar icon 640 (see FIG. 6) near or adjacent to the lens 410 and typically below the lens 410. Sliding the bar 641 of the slide bar 640 results in a proportional change in the concavity or scoop of the shoulder region 430 of the lens 410. The slide bar 640 not only informs the user that the shape of the shoulder region 430 of the lens 410 may be selected, but also provides the user with an indication as to what degree of shaping is possible. The slide bar 640 includes a bar 641 that may be slid left and right, or up and down, to adjust and indicate the degree of scooping. To control the degree of scooping, the user would click on the bar 641 of the slide bar 640 and drag in the direction of desired scooping degree. Once the desired degree of scooping is reached, the user would release the mouse button 310. The lens 410 is then locked with the selected scoop until a further scooping operation is performed.

Icon Hiding. Advantageously, a user may choose to hide one or more lens control icons 450, 412, 411, 421, 481, 482, 491, 440, 495, 640 shown in FIGS. 4 and 6 from view so as not to impede the user's view of the image within the lens 410. This may be helpful, for example, during an editing or move operation. A user may select this option through means such as a menu, toolbar, or lens property dialog box.

Redo and Undo. In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

Controlling Access to Secured Information Using Detail-In-Context Lenses. Detail-in-context data viewing techniques allow a user to view multiple levels of detail or resolution on one display 340. The appearance of the data display or presentation is that of one or more virtual lenses showing detail 233 within the context of a larger area view 210. Using multiple lenses in detail-in-context data presentations may be used to compare two regions of interest at the same time. Folding enhances this comparison by allowing the user to pull the regions of interest closer together. Moreover, using detail-in-context technology such as PDT, an area of interest can be magnified to pixel level resolution, or to any level of detail available from the source information, for in-depth review. In accordance with the present invention, detail-in-context lenses may be used to control user access to secured, confidential or otherwise protected information in digital images. The digital images may include graphic images, maps, photographic images, or text documents, and the source information may be in raster, vector, or text form.

Figure 5:
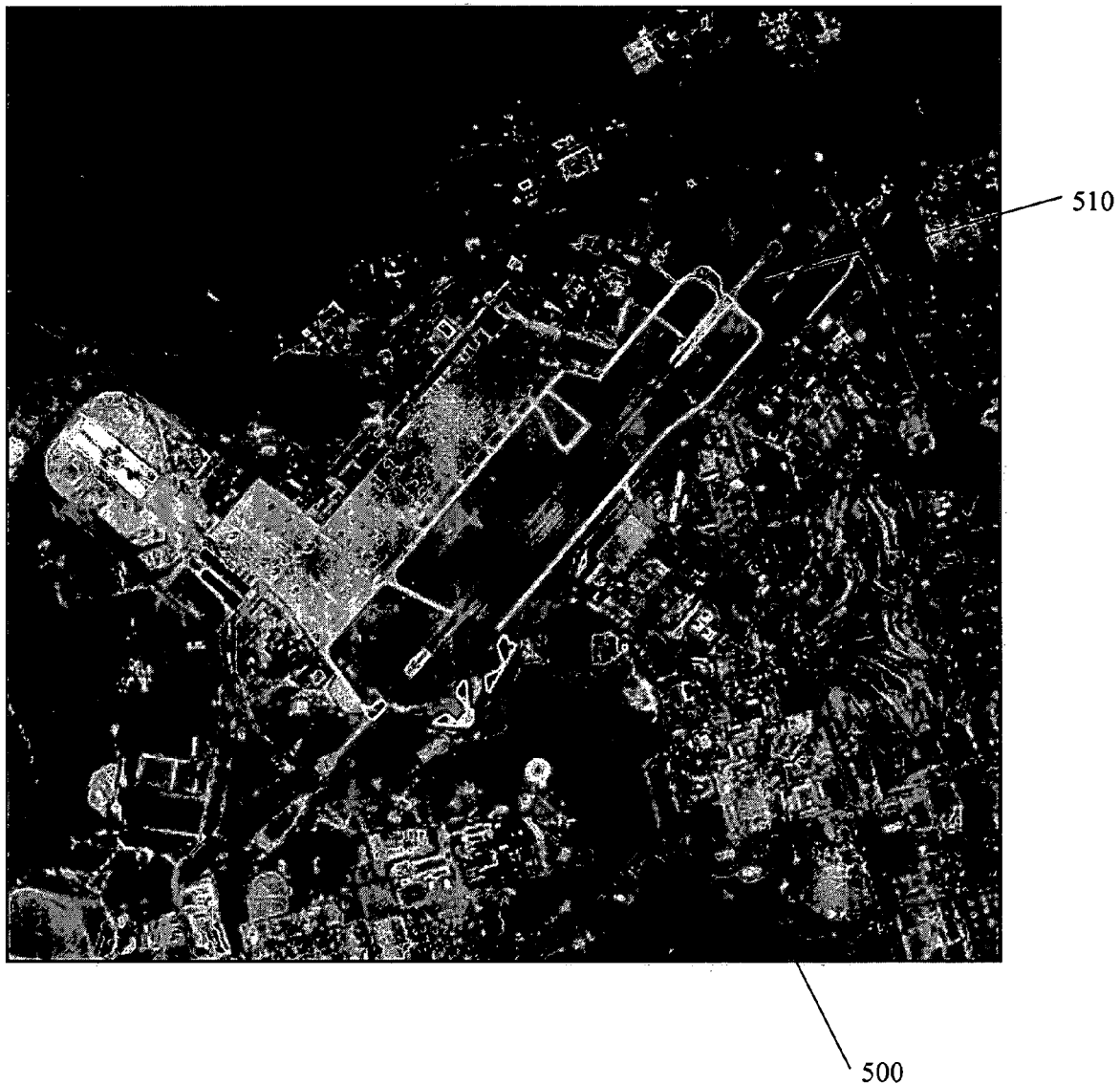
FIG. 5 is a screen capture illustrating an original digital image or representation of an airport in accordance with an embodiment of the invention.

FIG. 5 is a screen capture illustrating an original digital image or representation 500 in accordance with an embodiment of the invention. In FIG. 5, the original image 500 includes an airport 510. The original image 500 may also include secured (e.g. confidential) and unsecured (e.g. non-confidential) information. As will be described below, a user may only access or view secured information pertaining to the original image 500 if the user has the appropriate level of authorization. The secured information may include, for example, a detailed or magnified view of the airport 510 within the original image 500.

Figure 6:
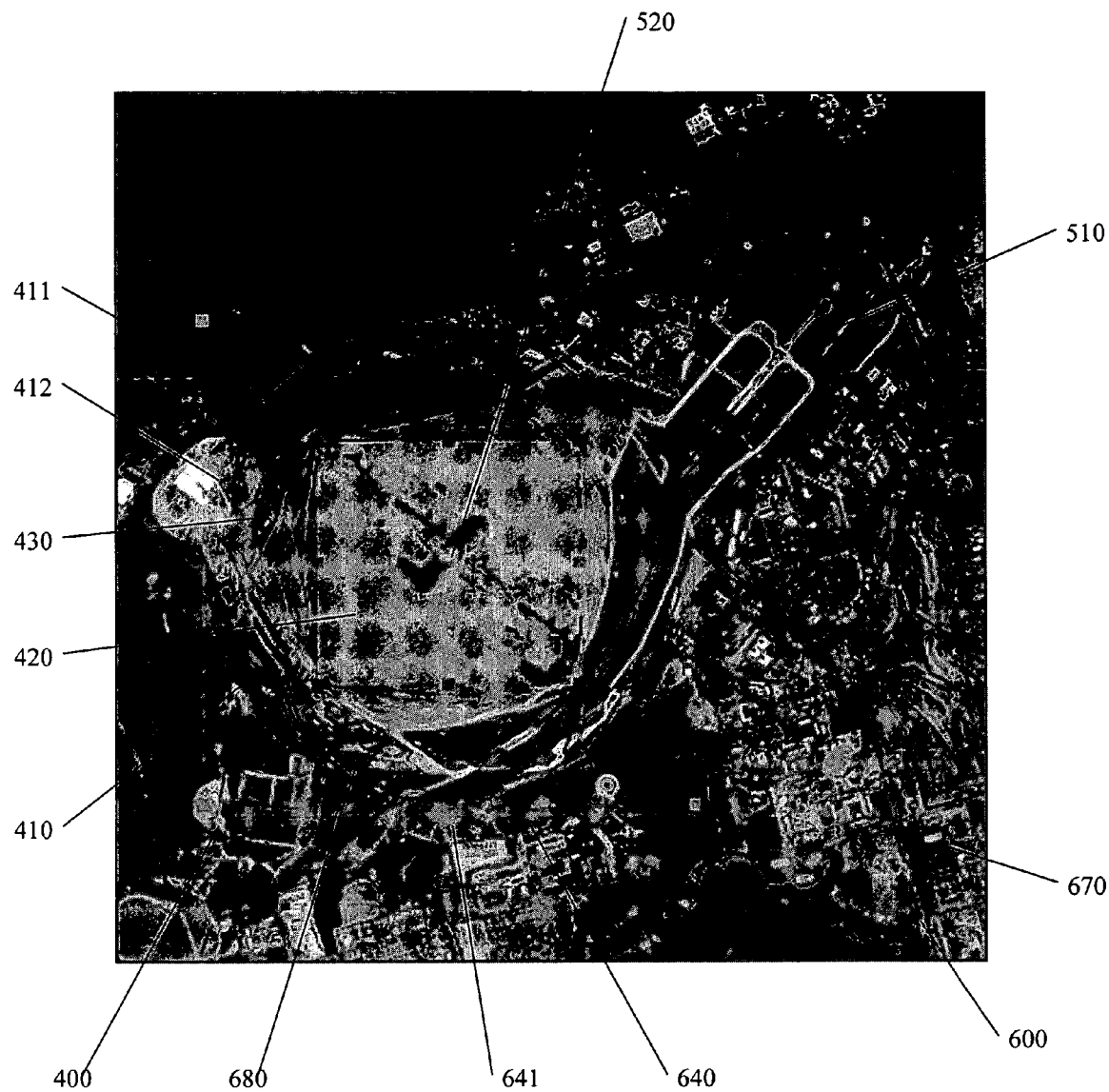
FIG. 6 is a screen capture illustrating a presentation having a detail-in-context lens and an associated GUI for the original digital image of FIG. 5 in accordance with an embodiment of the invention.

FIG. 6 is a screen capture illustrating a presentation 600 having a detail-in-context lens 410 and an associated GUI 400 for the original digital image 500 of FIG. 5 in accordance with an embodiment of the invention. In order to view a selected object or area in detail, such as an airplane 520 on the airport's runway, a user defines a lens 410 over the object 520 using the GUI 400. The lens 410 may be introduced to the original image 500 to form the illustrated presentation 600 through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the object 520 or area. Using the magnify lens control element, for example, the user may magnify the focal region 420 of the lens 410 to pixel quality resolution revealing detailed information pertaining to selected object 520 or area. That is, a base image (i.e., the image outside the extent of the lens) is displayed at a low resolution while a lens image (i.e., the image within the extent of the lens) is displayed at a resolution based on a user selected magnification 440, 441.

In FIG. 6, the base image 670 (i.e., that portion of presentation 600 outside the extent of the lens 410) shows a portion of the airport 510 and original image 500 at low resolution. The lens image 680 (i.e., that portion of the presentation 600 within the extent of the lens 410 and including the focal 420 and shoulder 430 regions of the lens 410) shows a portion of the airport 510 at high resolution thus revealing detailed information pertaining to the airplane 520 located on the airport's runway. Thus, the presentation 600 allows a user to view portions 670, 680 of the original image 500 simultaneously and in context.

In operation, the data processing system 300 employs EPS techniques with an input device 310 and GUI 400 for selecting objects 520 or areas for detailed display to a user on a display screen 340. Data representing an original image or representation is received by the CPU 320 of the data processing system 300. Using EPS techniques, the CPU 320 processes the data in accordance with instructions received from the user via an input device 310 and GUI 400 to produce a detail-in-context presentation 600. The presentation 600 is presented to the user on a display screen 340. It will be understood that the CPU 320 may apply a transformation to the shoulder region 430 surrounding the region-of-interest 420 to affect blending or folding in accordance with EPS technology. For example, the transformation may map the region-of-interest 420 and/or shoulder region 430 to a predefined lens surface, defined by a transformation or distortion function and having a variety of shapes, using EPS techniques. Or, the lens 410 may be simply coextensive with the region-of-interest 420. (Blending and folding of lenses in detail-in-context presentations are described in U.S. Patent Application Publication No. 2002/0044154 which is incorporated herein by reference.)

The lens control elements of the GUI 400 are adjusted by the user via an input device 310 to control the characteristics of the lens 410 in the detail-in-context presentation 600. Using an input device 310 such as a mouse, a user adjusts parameters of the lens 410 using icons and scroll bars of the GUI 400 that are displayed over the lens 410 on the display screen 340. The user may also adjust parameters of the image of the full scene. Signals representing input device 310 movements and selections are transmitted to the CPU 320 of the data processing system 300 where they are translated into instructions for lens control.

Moreover, the lens 410 may be added to the presentation 600 before or after the object 520 or area is selected. That is, the user may first add a lens 410 to a presentation 600 or the user may move a pre-existing lens into place over the selected object 520 or area. The lens 410 may be introduced to the original image to form the presentation 600 through the use of a pull-down menu selection, tool bar icon, etc.

Advantageously, by using a detail-in-context lens 410 to select an object 520 or area for detailed information gathering, a user can view a large area 670 (i.e., outside the extent of the lens 410) while focusing in on a smaller area 680 (or within the focal region 420 of the lens 410) surrounding the selected object 520. This makes it possible for a user to accurately gather detailed information without losing visibility or context of the portion of the original image surrounding the selected object 520.

Figure 7:
FIG. 7 is a screen capture illustrating the effect of a user access control element on a detail-in-context presentation for an original image in accordance with an embodiment of the invention.

Now, according to an embodiment of the present invention, the GUI 400 also includes a user access control element. FIG. 7 is a screen capture illustrating the effect of the user access control element on a detail-in-context presentation 700 for an original image 500 in accordance with an embodiment of the invention. The user access control element causes the lens image 680 of the presentation 700 be occluded by an access denied icon 750 when the user does not have authorization to view detailed information made available in the lens image 680. The access denied icon 750 may occlude the entire lens image 680 or a portion of the lens image 680 such as the focal region 420.

To determine if a user is authorized to view the lens image 680, the user access control element may include an associated user access pop-up dialog window or box (not shown) which may be displayed over or adjacent to the lens 410. The user access dialog box requests that the user enter a user identification number ("ID") and a password, or similar credentials, to determine if the user is authorized to view the lens image 680. The user ID and password are checked or authenticated against a database or table stored in the memory 330 of the data processing system 300. If the user ID and password are valid or authentic, the access denied icon 750 is removed and the user is allowed to view the lens image 680. Alternatively, the user access control element may have an associated toolbar or pull-down menu to effect user authentication.

Figure 8:
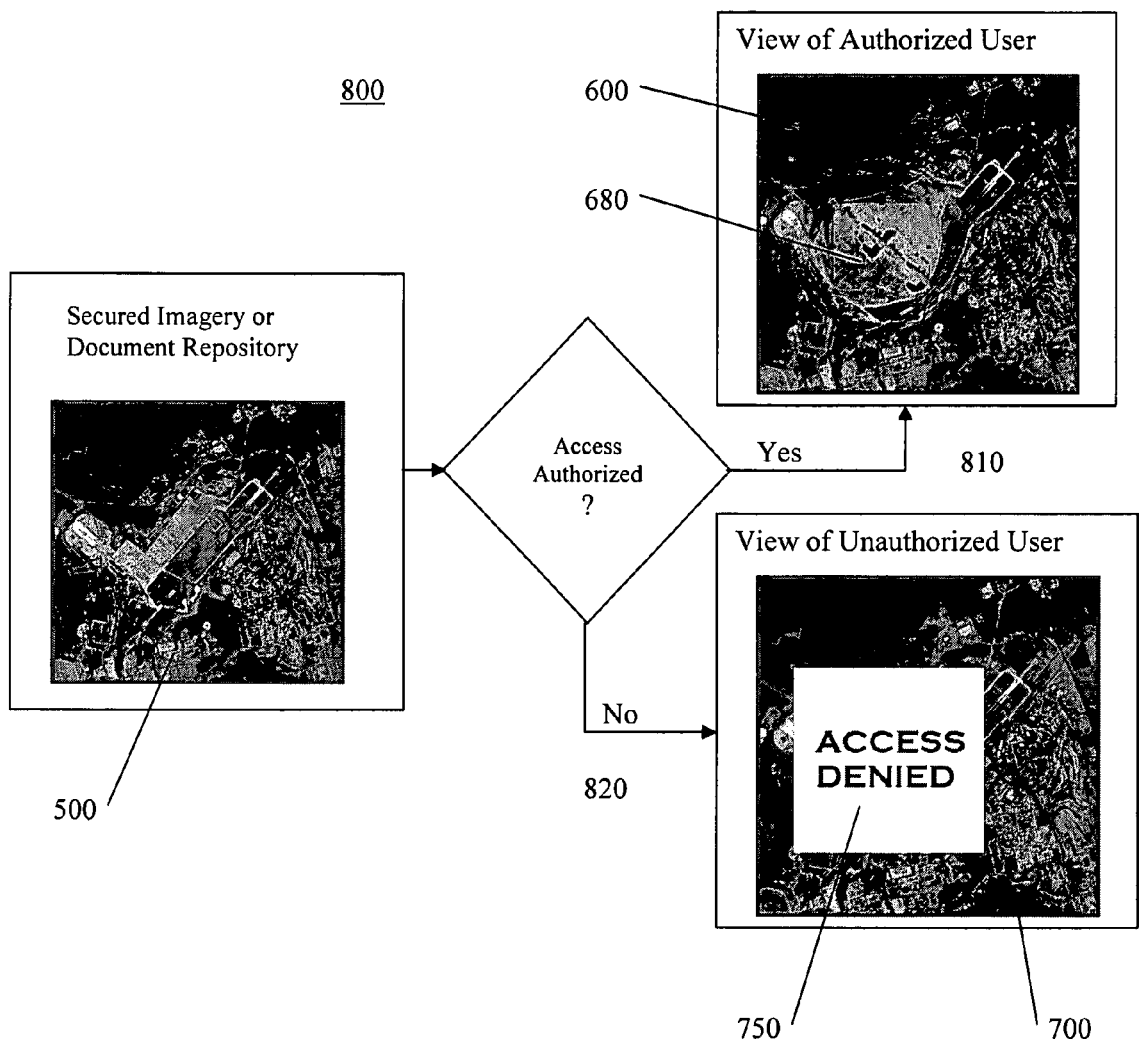
FIG. 8 is a block diagram illustrating user access control element functionality in accordance with an embodiment of the invention; and, FIG. 9 is a flow chart illustrating a method for controlling access to detailed information for a predetermined region of a computer generated original image presented on a display in accordance with an embodiment of the invention.

FIG. 8 is a block diagram 800 illustrating user access control element functionality in accordance with an embodiment of the invention. Given an original image 500 having secured information, the original image 500 being stored in the memory 330 of the data processing system 300 or other document repository, if a user has authorized access 810 to the secured information, then the user is allowed to view the secured information in the lens image 680 of a detail-in-context presentation 600. However, if the user does not have authorized access 820 to the secured information, then the lens image 680 is occluded by an access denied icon 750 in the detail-in-context presentation 700.

The present invention allows for the control of information displayed in the lens image 680 independent from the information displayed in the surrounding base image 670. In this way, when it is desired that access to the lens image 680 be secured or restricted, the user access control element may be activated and the control of user access my be effected by means of a user access dialog box. User access to the lens image 680 may be secured, for example, when the detailed information revealed by the lens image 680 pertains to confidential, politically sensitive, or militarily sensitive subject matter. In these circumstances, the user access control element prevents unauthorized viewing of the detailed information in the lens image 680. Advantageously, while the user access control element prevents unauthorized viewing of secured information in the lens image 680, it allows a user to view unsecured information in the surrounding base image 670. Thus, the context of the secured information within the unsecured information is maintained for the user.

According to one embodiment of the invention, the original image 500 is encrypted and the user access control element includes means to decrypt the lens image 680 for presentation to the user. The decryption means may be incorporated in the user access dialog box.

According to one embodiment of the invention, the input device 310 of the data processing system 300 may include a biometric information input device (e.g., scanner, digitizer, etc.) for receiving biometric information or credentials to authenticate the user in conjunction with the user access control element. The biometric information may include fingerprint, iris pattern, voice pattern, or DNA pattern information for identifying the user. The input of biometric information may be requested by the user access dialog box.

According to one embodiment of the invention, if it is desired to prevent a user from viewing predetermined areas of the original image 500 at a magnified level, the lens 410 may be prevented from being positioned over those predetermined areas. Alternatively, the lens 410 may be otherwise prevented from displaying data for those predetermined areas. For example, when the lens 410 is positioned over a predetermined secure area, the magnify lens control element 440, 441 may be inhibited thus preventing the user from viewing the secure area in detail. This embodiment of the invention may be used, for example, in an Internet commerce application in situations where it is desired to let the user inspect part of an image in detail while preventing the user from downloading the entirety of the image without purchasing the rights to do so.

Figure 9:
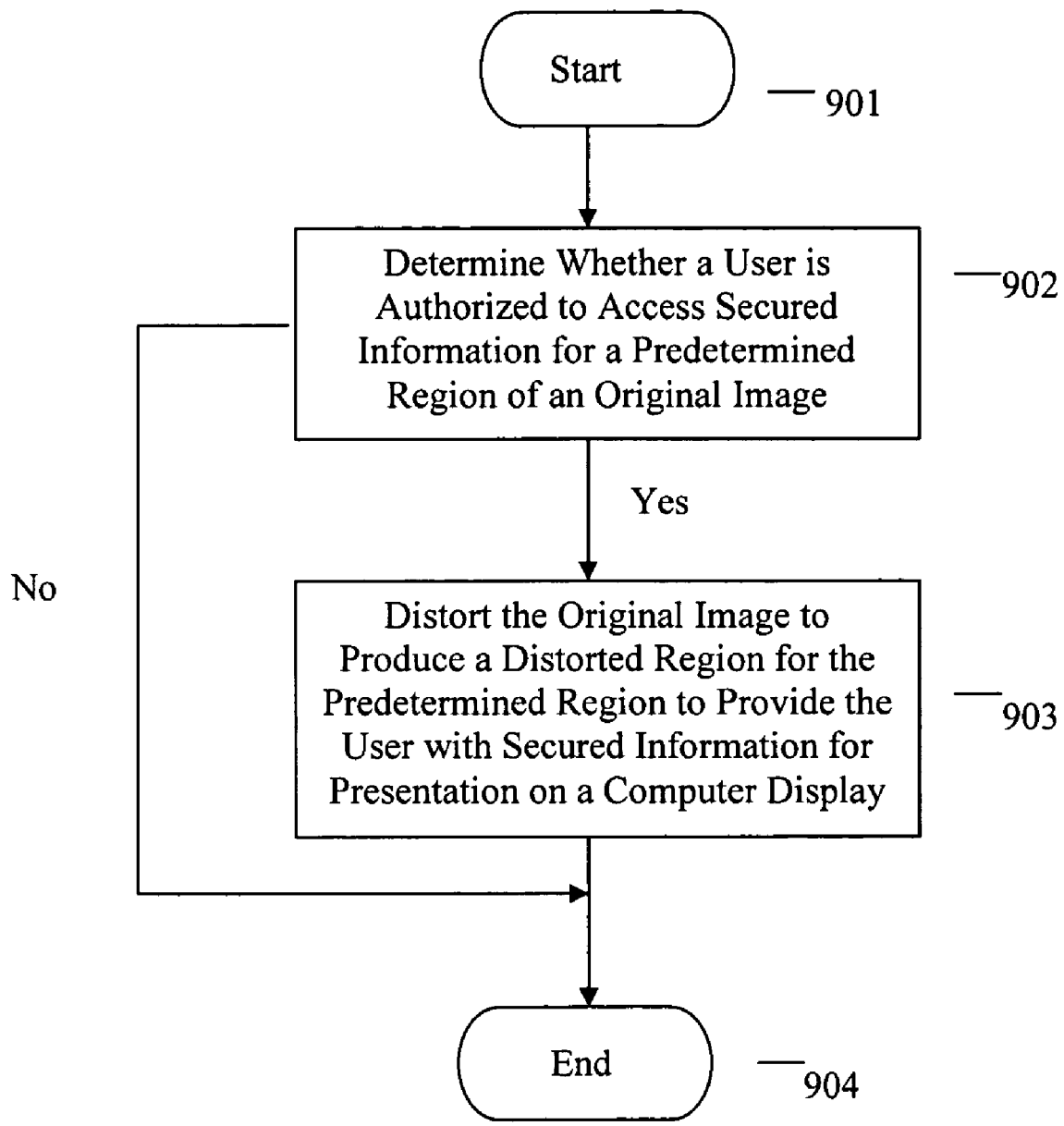

Method. FIG. 9 is a flow chart 900 illustrating a method for controlling access to secured information for a predetermined region 411, 412 of a computer generated original image 500 presented on a display 340 in accordance with an embodiment of the invention. At step 901, the method starts.

At step 902, whether a user is authorized to access the secured information is determined.

Preferably, the method further includes, in response to the step of determining 902, uncovering 750 the distorted region 680. Preferably, the step of determining 902 further includes receiving authentication information from the user and comparing the authentication information to stored authentication information for the user. Preferably, the authentication information includes a user identification number and a password. Preferably, the authentication information is received through a dialog box. Preferably, the dialog box is presented adjacent to the predetermined region 412 (or 411). Preferably, the method further includes the step of receiving a signal from the user to select the predetermined region 412 (or 411). Preferably, the signal is generated by moving a cursor 410 on the display 340 with a pointing device 310. Preferably, the pointing device 310 is a mouse. Preferably, the original image 500 includes a graphic image, a photographic image, and a text image. Preferably, the authentication information is biometric information including fingerprint, iris pattern, voice pattern, and DNA pattern information.

At step 903, in response to this determination 902, the original image 500 is distorted to produce a distorted region 680 for the predetermined region 412 (or 411) to provide the user with the secured information on the display 340.

Preferably, the secured information is detailed information. Preferably, the detailed information is a magnified image (440, 441). Preferably, the secured information is encrypted information. Preferably, the step of distorting 903 further comprises decrypting the encrypted information. Preferably, the step of distorting 903 further includes: creating a lens surface 410 for the distorted region 680; and, transforming the original image 500 by applying a distortion function defining the lens surface 410 to the original image 500. Preferably, the step of creating further includes displaying a GUI 400 over the distorted region 680 for adjusting the lens surface 410. Preferably, the lens surface 410 includes a focal region 420 and a base 412 and the GUI 400 includes: a slide bar icon 440, 441 for adjusting a magnification for the lens surface 410; a slide bar icon 640, 641 for adjusting a degree of scooping for the lens surface 410; a bounding rectangle icon 421 with at least one handle icon 481, 482 for adjusting a size and a shape for the focal region 420; a bounding rectangle icon 411 with at least one handle icon 491 for adjusting a size and a shape for the base 412; a move icon 460 for adjusting a location for the lens surface 410 within the original image 500; a pickup icon 450 for adjusting a location for the base 412 within the original image 500; and, a fold icon 470 for adjusting a location for the focal region 420 relative to the base 412.

At step 904, the method ends.

Data Carrier Product. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although preferred embodiments of the invention have been described herein, it will be understood by those skilled in the art that variations may be made thereto without departing from the spirit of the invention or the scope of the appended claims.

The embodiments of the invention in which an exclusive property or privilege is claimed are defined as follows:

1. A method comprising:
   determining whether access is authorized to secured information in a predetermined region of an image; and
   distorting said predetermined region by:
      applying a distortion function to said image by displacing said image onto said distortion function; and
      projecting said image, to which the distortion function has been applied, onto a plane, to present said secured information with context from said image when said determining indicates that access is authorized, wherein said secured information is presented with a graphical user interface ("GUI"), over said predetermined region, to receive one or more signals for adjusting said distortion function.

2. The method of claim 1, further comprising uncovering said predetermined region when said determining indicates that access is authorized.

3. The method of claim 1, wherein said determining comprises:
   receiving authentication information; and
   comparing said authentication information to stored authentication information to indicate whether access is authorized.

4. The method of claim 3, wherein said authentication information includes at least one of:
   a user identification or
   a password.

5. The method of claim 3, wherein said authentication information is received through a dialog box.

6. The method of claim 5, wherein said dialog box is presented adjacent to said predetermined region.

7. The method of claim 1, wherein said determining is performed in response to receipt of a signal that selects said predetermined region.

8. The method of claim 7, wherein said signal comprises a cursor movement.

9. The method of claim 8, wherein said predetermined region is presented at a same level of detail as said context when authorization is denied.

10. The method of claim 1, wherein said distorting results in presentation of said secured information in detail in comparison to said context from said image.

11. The method of claim 1, wherein said distorting comprises magnifying said predetermined region in comparison to said image.

12. The method of claim 1, wherein said secured information comprises encrypted information.

13. The method of claim 12, wherein said distorting further comprises decrypting said encrypted information.

14. The method of claim 1, wherein said image comprises at least one of:
   a graphic image,
   a photographic image, or
   a text image.

15. The method of claim 1, wherein said applying results in presentation of a focal region having a magnification for said predetermined region at least partially surrounded by a shoulder region where said magnification decreases to that of said image to provide context for said predetermined region with respect to said image, and said GUI is for adjusting at least one of:
   said magnification,
   a concavity of said shoulder region,
   an extent for said focal region,
   an extent for said shoulder region,
   a location for said distortion function within said image,
   a location for an outline of said shoulder region within said image, or
   a location for said focal region relative to said shoulder region to define a degree and a direction of a folding of said distortion function.

16. The method of claim 1, wherein said determining further comprises:
   receiving biometric information; and
   comparing said biometric information to stored biometric information.

17. The method of claim 16, wherein said biometric information comprises one or more of:
   a fingerprint,
   an iris pattern,
   a voice pattern, or
   DNA pattern information.

18. The method of claim 1, wherein said distorting comprises manipulating said image.

19. A method comprising:
   determining whether access is authorized to detailed information included in a predetermined region of an image; and
   magnifying said predetermined region by:
      applying a magnification function to said image by displacing said image onto said magnification function; and
      projecting said image, to which the magnification function has been applied, onto a plane, to present said detailed information at a higher resolution than a context region when said determining indicates that access is authorized, wherein said detailed information is presented with a graphical user interface ("GUI"), over said predetermined region, to receive one or more signals for adjusting said magnification function.

20. The method of claim 19, further comprising uncovering said predetermined region when said determining indicates that access is authorized.

21. The method of claim 19, wherein said predetermined region is presented at a same level of detail as said context region when said determining indicates access is denied.

22. One or more computer-readable media comprising instructions that, responsive to being executed by a computing system, cause the computing system to:
   determine whether access is authorized to secured information included in a predetermined region of an image; and
   distort said predetermined region through:
      application of a distortion function to said image through displacement of said image onto said distortion function; and projection of said image, to which the distortion function has been applied, onto a plane, to present said secured information in detail in comparison to a context region of said image, when access is authorized, wherein said secured information is presented with a graphical user interface ("GUI"), over said predetermined region, to receive one or more signals that adjust said distortion function.

23. The one or more computer-readable media of claim 22, wherein said secured information comprises encrypted information.

24. The one or more computer-readable media of claim 22, wherein said instructions are further executable to present a shoulder region that surrounds said predetermined region to provide context between said secured information and said context region.

25. The one or more computer-readable media of claim 22, wherein said image comprises one or more of:
- an original image,
- a base image,
- a graphic image,
- a photographic image, or
- a text image.

26. A system comprising:
a processor coupled to memory that includes instructions that, responsive to being executed by the processor, cause the system to provide one or more modules that include:
 a module to determine whether access is authorized to detailed information in a predetermined region of an image presented on a display;
 a module to generate a presentation on said display through application of a distortion function to said image by displacement of said image onto said distortion function and projection of said image, with the distortion function applied, onto a plane, wherein said presentation includes said predetermined region presented at a higher resolution than a remainder of said image responsive to a determination that access is authorized to said detailed information, said predetermined region being positioned with respect to the remainder of the image so said predetermined region is presented in context with said remainder to indicate said predetermined region's location in said image, wherein said module to generate a presentation is configured to present a graphical user interface ("GUI"), over said predetermined region, to receive one or more signals that adjust said distortion function.

27. The system of claim 26, wherein said module to generate the presentation is further configured to present a shoulder region adjacent said predetermined region, said shoulder region being configured to blend the predetermined region with said remainder of the image.

28. The system of claim 26, wherein said remainder of the image comprises a portion of said image that is not said predetermined region.

29. The system of claim 26, wherein said module to generate the presentation is further configured to present an icon to prevent observation of said predetermined region when access is denied.

30. One or more computer-readable media comprising instructions that, responsive to being executed by a computing system, cause the computing system to:
 determine whether access is authorized to secured information in a predetermined region of an image; and
 magnify the predetermined region through:
  application of a magnification function to said image through displacement of said image onto said magnification function; and
  projection of said image, to which the magnification function has been applied, onto a plane, to present said secured information with context from said image when access is authorized to said secured information, said secured information being presented such that said predetermined region's location is maintained to show the predetermined region's location in the image, wherein said secured information is presented with a graphical user interface ("GUI"), over said predetermined region, to receive one or more signals for adjusting said magnification function.

31. The one or more computer-readable media of claim 30, wherein the instructions are further executable to cause the computing system to present a graphical user interface that covers said predetermined region when access to said secured information is not authorized.

32. The one or more computer-readable media of claim 30, wherein to magnify the predetermined region causes the computing system to:
 at least partially surround the predetermined region with a shoulder region in which magnification decreases to the context's magnification.

* * * * *

UNITED STATES PATENT AND TRADEMARK OFFICE
CERTIFICATE OF CORRECTION

PATENT NO. : 7,761,713 B2  Page 1 of 1
APPLICATION NO. : 10/705199
DATED : July 20, 2010
INVENTOR(S) : David J. P. Baar It is certified that error appears in the above-identified patent and that said Letters Patent is hereby corrected as shown below:

On page 4, column 1, line 30 under "Other Publications", delete "Laborator;" and insert -- Laboratory; --, therefor.

On page 4, column 2, line 58 under "Other Publications", delete "an" and insert -- and --, therefor.

In the Specifications:
In column 1, line 5, below "PRESENTATIONS" insert -- RELATED APPLICATION DATA --.

In column 6, line 61, delete "For" and insert -- for --, therefor.

In column 7, line 14, delete "The" and insert -- the --, therefor.

In column 8, line 49, delete "comer" and insert -- corner --, therefor.

In column 8, line 51, delete "comer" and insert -- corner --, therefor.

In column 8, line 53, delete "comer" and insert -- corner --, therefor.

In column 9, line 35, delete "comer" and insert -- corner --, therefor.

In column 9, line 39, delete "comer" and insert -- corner --, therefor.

In column 9, line 51, delete "comer" and insert -- corner --, therefor.

In column 10, line 3, delete "comer" and insert -- corner --, therefor.

In column 10, line 7, delete "comer" and insert -- corner --, therefor.

In column 10, line 21, delete "comer" and insert -- corner --, therefor.

In column 15, line 23, delete "my" and insert -- may --, therefor.

Signed and Sealed this

Ninth Day of November, 2010

David J. Kappos
*Director of the United States Patent and Trademark Office*